July 25, 1933.  C. E. STEWART  1,919,992
IMPULSE STORAGE MECHANISM
Filed Jan. 18, 1929
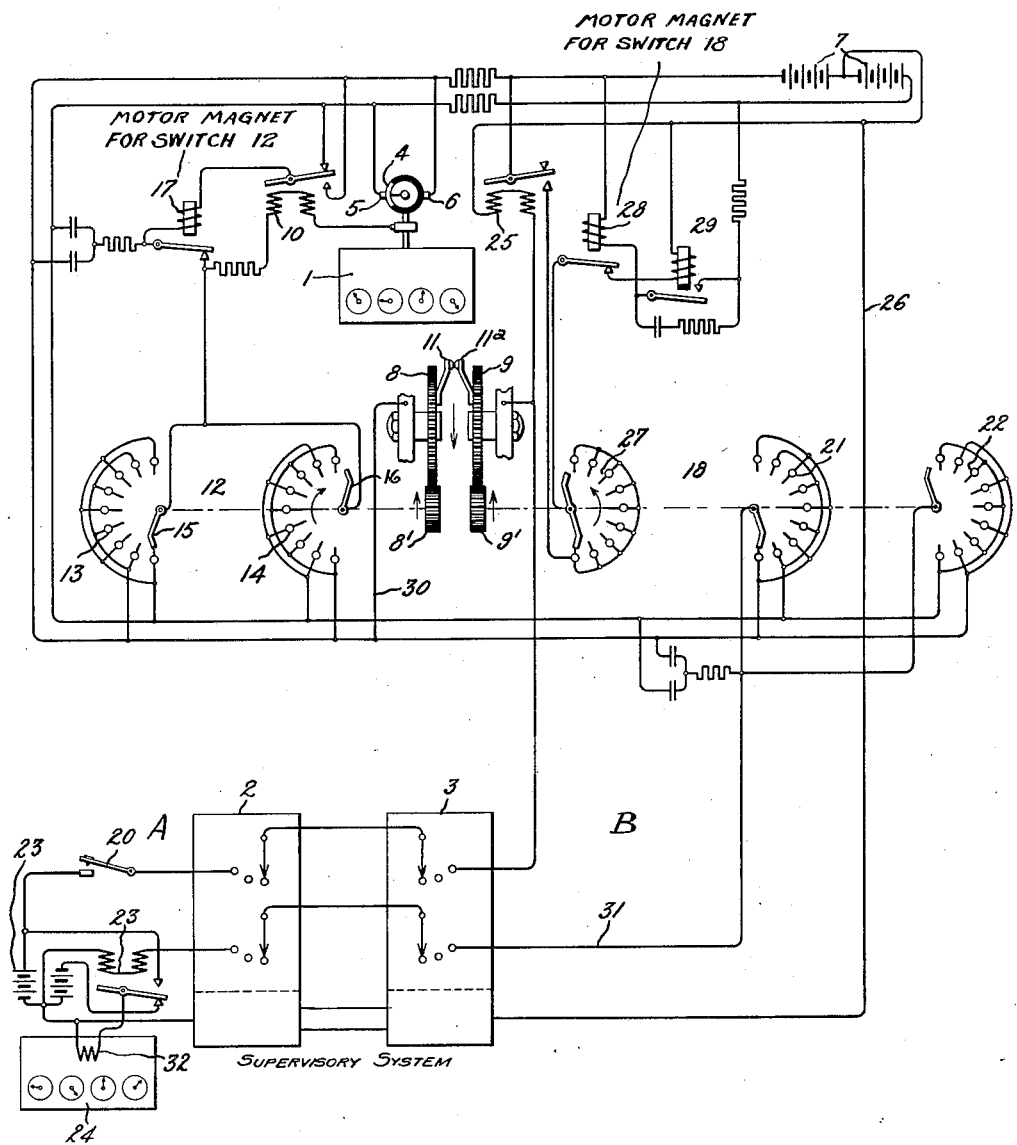
Inventor:
Clyde E. Stewart
by Charles E Tulla
His Attorney Patented July 25, 1933

1,919,992

UNITED STATES PATENT OFFICE

CLYDE E. STEWART, OF DREXEL HILL, PENNSYLVANIA, ASSIGNOR TO GENERAL ELECTRIC COMPANY, A CORPORATION OF NEW YORK

IMPULSE STORAGE MECHANISM

Application filed January 18, 1929. Serial No. 333,408.

My invention relates to impulse storage mechanism and to the use of such mechanism for indicating at a distance the reading of integrating devices such, for example, as watthour meters.

In systems where remotely located stations, comprising a dispatcher's station, for example, and an outlying sub-station are connected by switching means such, for example, as the supervisory system disclosed in my copending application, Serial No. 260,168, filed March 8, 1928, entitled "Supervisory control systems", it is frequently desirable to determine the reading of integrating devices at the outlying station through connections established only at desired intervals through the supervisory system.

In accordance with my present invention this is accomplished by providing means associated with the integrating device for producing electrical impulses at a rate dependent upon the quantity integrated together with means whereby these impulses may be stored up, or totalized, in the remote station. The number of impulses totalized will be dependent upon the quantity integrated by said device during the interval of totalization. Means are also provided in the outlying station which may be controlled by the dispatcher through the supervisory system and which, when released, transmits to the dispatcher's station at any suitable rate a number of impulses dependent upon the number of impulses stored, or totalized, at the remote station, during the interval since the last reading of the integrating device. These impulses which are transmitted only when the readings of the remote integrating device is being determined are then integrated in the dispatcher's station and an indication provided which is dependent upon the total number of impulses received at the dispatcher's station. This indication, of course, corresponds to the reading of the remote integrating device.

One of the objects of my invention is to provide means whereby the result indicated may be accomplished in an efficient and practical manner, and to provide a novel method and means whereby the reading of remote integrating devices may be readily determined.

A further object of the invention is to provide means whereby an indication may be transmitted from the remote station to the dispatcher's station, at desired intervals, corresponding to the quantity integrated by the integrating device during the interval since the last indication was transmitted and means in the dispatcher's station whereby the quantity represented by a plurality of said indications may be totalized thereby to indicate the reading of the remote device.

A further object of my invention is to provide means whereby impulses produced at a rate dependent upon some variable, as for example, a quantity being integrated, speed of rotation of a revolving shaft, or the like, may be effectively stored, by a suitable mechanism and released at desired intervals, the number of impulses released being dependent upon the number stored in the mechanism.

While I particularly contemplate the use of my invention in connection with the remote determination of the readings of integrating devices it will of course be understood that I do not wish to be limited thereto since my invention has many other applications of utility as well.

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawing in which the single figure represents an embodiment of my invention:—

Referring to the drawing, I have indicated at 1 any suitable type of integrating device such, for example, as a watthour meter located in an outlying station B, and the reading of which is to be indicated in a dispatcher's station A. The stations A and B are arranged to be connected through any suitable type of switching mechanism which may, for example, comprise a supervisory control system of the type indicated in my above mentioned copending application. This switching mechanism is indicated in the drawing by rectangles 2 and 3 each of which represents that portion of a supervisory equipment which is included in the respective stations. Associated with the integrating device 1 is any suitable means for transmitting impulses therefrom at a rate dependent upon the quantity integrated. As shown in the drawing, this means comprises a rotating commutator having a conducting segment 4 which is adapted alternately to engage brushes 5 and 6 thereby to connect one terminal of the polarized relay 10 to the positive or negative side of a source of potential 7.

At the center of the drawing I have shown a pair of gears 8 and 9 which carry contacts 11 and 11a respectively. These contacts are positioned for engagement with each other when the gears 8 and 9 occupy corresponding positions in rotation. The gear 8 is adapted to be driven through reduction gear 8' by any suitable motor mechanism 12 at a rate dependent upon the quantity integrated. As shown this motor mechanism is in the form of a step by step selector switch having a pair of banks of contacts 13 and 14, cooperating wipers 15 and 16, and a driving motor magnet 17. This motor magnet is adapted to be energized and deenergized in response to each impulse from the integrating device 1, and in response thereto to advance wipers 15 and 16 one step. Thus it will be seen that the contact 11 is displaced in position from contact 11a of an amount dependent upon the total impulses transmitted from the integrating device 1 during any desired interval. Contact carrying gear 9 is arranged to be driven by a second motor mechanism, which in the form shown, comprises a selector switch 18 to the shaft of which the gear 9 is connected through a reduction gear 9'. Switch 18 is arranged to be controlled in response to a key 20 in the dispatcher's station and is provided with circuit arrangements such that upon closure of the key 20 the switch rotates driving the gear 9 until the contacts 11 and 11a engage at which time its operation is interrupted. During rotation of the switch 18 by means of its banks of contacts 21 and 22 impulses are transmitted through the supervisory system to a polarized relay 23 in the dispatcher's station. This relay serves to supply impulses to a suitable counting device 24 having dials similar to the integrating device 1 and the reading of which constitutes an indication of the reading of integrating device 1.

Having now generally indicated the character of my invention the more detailed circuit arrangement and operation of the device will be explained.

It will be seen that alternate contacts of each of the banks 13 and 14 of the switch 12 are connected to opposite terminals of the source of potential 7, and that the wipers of these contacts which are connected together extend in diametrically opposite directions so that but one wiper is in engagement with its bank of contacts at any one time. With the apparatus in the position shown in the drawing it will be seen that both terminals of the polarized relay 10 are connected to the positive side of the battery 7, one terminal being connected thereto through wiper 15 and the other through the conducting segment 4 and brush 5 of the integrating device. Polarized relay 10 is therefore deenergized. This relay, however, is of the position type and its armature remains in the position to which it was last actuated.

When the segment 4 engages brush 6 a circuit is completed from the negative side of the battery 7 through brush 6, polarized relay 10 and wiper 15 to the opposite side of the battery. The armature of polarized relay 10 is then actuated to its lower position thereby completing a circuit extending from the negative side of the battery through the lower contact and armature of polarized relay 10, motor magnet 17 and its armature and wiper 15 to the positive side of the battery. Motor magnet 17 then actuates its armature and thereby deenergizes itself advancing the wipers 15 and 16 one step in which position wiper 15 is connected to the negative side of the battery and relay 10 is again deenergized. When the segment 4 again engages brush 5 polarized relay 10 will be connected between the negative side of the battery 7 at wiper 15 and the positive side thereof at brush 5. This relay will then again be energized and its armature will be actuated back to the position shown in the drawing and a successive stepping operation of the wipers 15 and 16 will occur. This operation of the selector switch will of course continue through the complete revolution thereof at a rate dependent upon the quantity integrated by the device 1. It will be seen that the contact 11 will thus be carried away from contact 11a at the rate of and by an amount dependent upon the quantity indicated during any desired interval.

To increase the capacity of the device wipers 15 and 16 extend, as described, in diametrically opposite directions and alternately engage their respective banks of contacts. As ordinarily constructed each bank of these switches include about 25 contacts. By utilizing the wipers alternately in this way a total of 50 impulses will be required to cause an actuation of the gear 8' through a complete revolution. The ratio between the diameters of gears 8 and 8' may be suitably chosen depending upon the requirements of the system to give the device any suitable capacity. For example, if this ratio is 5 to 1 it will be seen that a total of 250 impulses from the meter 1 will be required to rotate the contact carrying gear 8 through one revolution.

When the operator desires to determine the reading of the integrating device 1 he will first complete the circuit from the key 20 to the remote station through the supervisory system, in a well known manner dependent, upon the nature of switching equipment 2, 3 which is employed. He will then close the key 20 thereby completing a circuit extending from the positive side of battery 23 through supervisory equipment 2, 3, polarized relay 25 at the remote station and conductor 26 back through the supervisory equipment to the opposite side of the battery 23. Relay 25 will then actuate its armature to its circuit closing position thereby completing a circuit from the negative side of battery 7 through the armature of relay 25, wiper of bank 27 of the switch 18, all of the contacts of which are connected together, armature of motor magnet 28, and winding of relay 29 to the mid-point of the battery 7. Relay 29 will then complete an obvious circuit for motor magnet 28. Energization of motor magnet 28 interrupts the circuit of relay 29 which in turn deenergizes motor magnet 28 whereupon the wipers of the switch 18 are advanced one step. Relay 29 will then again be energized and the cycle of operations repeated, the wipers of the switch 18 being advanced step by step driving gear 9 in the same direction in which gear 8 was actuated until the contact 11a again engages contact 11. When this occurs a circuit is completed extending from the negative side of battery 7 through conductor 30, gear 8 contacts 11 and 11a, gear 9, polarized relay 25 to the mid-point of the battery 7. The polarity of current in this circuit is such that the armature of relay 25 will be actuated away from its circuit making contact thereby interrupting the circuit of relay 29 and hence interrupting the operation of a selector switch 18.

Relay 29 is preferably of the slow acting type, whereby, it prevents impulses from being sent to the dispatcher's station at a rate greater than is desired.

It will be seen that the alternate contacts of banks 21 and 22 of switch 18 are, similarly with banks 13 and 14, connected to points of opposite polarity on the battery 7, and that the wipers of these contacts alternately engage their respective banks. These wipers are connected together and are included in a circuit which extends from either the positive or negative side of the battery 7 through one contact of either of the banks 21 and 22, depending upon the position of the switch, conductor 31, supervisory system 2, 3, relay 23 at the dispatcher's station and then back through the supervisory system to the conductor 26 and the mid-point of the battery 7 at the remote station. Thus relay 23 at the dispatcher's station will receive impulses of reversed polarity as the switch 18 rotates in response to pressing the key 20 by the operator. The number of these impulses will of course be dependent upon the initial displacement of contact 11 from contact 11a. Polarized relay 23 will cause energization of the driving magnet 32 of the counting device 24 upon each actuation thereof through circuits which are obvious from the drawing. Thus the number of impulses received by the counting device 24 will be dependent upon the displacement of contact 11 with respect to contact 11a, and hence upon the number of impulses transmitted from the meter 1 since the time when its reading was last determined. Then the change in the reading of counter 24 during each operation will indicate the quantity integrated by device 1 since the reading of that device was last determined. Since the counting device 24 totalizes all of the impulses received by it at a plurality of intervals when readings are taken, it will be seen that its reading at any time when the reading of the integrating device 1 is being determined will correspond directly with the reading of that device.

It will thus be seen that in effect the system comprises a means whereby impulses produced by the meter 1 are stored up or totalized in the remote station, and released or discharged at desired intervals when the reading of the device 1 is to be determined.

While I have shown a particular embodiment of my invention it will of course be understood that I do not wish to be limited thereto since many modifications, both in the circuit arrangement and in the instrumentalities employed, may be made without departing from the spirit and scope of my invention as set forth in the appended claims.

What I claim as new and desire to secure by Letters Patent of the United States, is:

1. The method of determining at a dispatcher's station the reading of an integrating device at a remote station which includes producing impulses at a rate dependent upon the quantity integrated, totalizing said impulses at the remote station, transmitting to the dispatcher's station at desired intervals a number of impulses dependent upon the number totalized at the remote station and totalizing said last impulses at the dispatcher's station.

2. The method of determining at a dispatcher's station the reading of an integrating device in a remote station which includes transmitting series of electric impulses from the remote station to the dispatcher's station when desired during integration of said device, said series of impulses representing the quantities integrated during successive intervals, the number of impulses in said series being dependent upon the quantities integrated during the respective intervals, and totalizing said impulses in the dispatcher's station thereby to determine the reading of the integrating device.

3. In combination, a dispatcher's station, a remote station, an integrating device in the remote station, means for transmitting indications from the remote station to the dispatcher's station at desired intervals during integration of said device, each of said indications representing and differing from other indications and being dependent upon the quantity integrated by said device since the last indication was transmitted, and means in the dispatcher's station for totalizing the quantities represented by a plurality of said indications.

4. In combination, a dispatcher's station, a remote station, an integrating device in the remote station, means for separately integrating in the remote station the quantity integrated by said device during successive intervals, means for sending to the dispatcher's station at the end of each of said intervals an indication of the quantity integrated by said means during the respective interval, means for causing said last means to transmit indications when desired, and means for totalizing in the dispatcher's station the quantities represented by a plurality of said indications.

5. In combination, a dispatcher's station, a remote station, a rotating device in the remote station, means for producing impulses at a rate dependent upon the rate of rotation of said device whereby each of said impulses represents a definite quantity, means for totalizing in the remote station the impulses produced by said means during successive intervals, means for sending to the dispatcher's station at the end of each of said intervals an indication representing the quantity totalized during the respective interval, and means for totalizing in the dispatcher's station the quantities represented by a plurality of said indications.

6. In combination, an integrating device, means for producing impulses at a rate dependent upon the quantity integrated, a member, means responsive to said impulses for displacing said member by an amount dependent upon the quantity integrated, a second member, means for actuating said second member at desired intervals through a distance equivalent to the displacement of said first member and for transmitting impulses at predetermined increments of movement of said second member, said means including means responsive to the relative position of said members for interrupting actuation of said second member and means at a remote point responsive to said impulses for indicating the quantity integrated by said device.

7. In combination, an integrating means, a pair of devices mounted for rotation about a common axis, means for normally rotating one of said devices at a rate dependent upon the quantity integrated, remotely controlled means for rotating the other device, means responsive to the relative position of said devices for interrupting the rotation of said other device, means for transmitting impulses at predetermined increments of movement of said other device, and means at a remote point responsive to said impulses for indicating the quantity integrated by said integrating means.

8. In combination, an integrating device, a rotary step by step device having a driving magnet, means for supplying impulses to said driving magnet at a rate dependent upon the quantity integrated by said integrating device, whereby said step by step device is actuated through an arc dependent upon the quantity integrated during a desired interval, a rotary switch, means for actuating said switch through an arc corresponding to the arc through which said step by step device is actuated, said means including means responsive to the relative positions of said device and said switch for interrupting the actuation of said switch, a circuit including said switch, said switch being arranged to complete said circuit at predetermined increments of movement thereof, and counting means included in said circuit for indicating the reading of said integrating device.

9. In combination, a remote station, a dispatcher's station, an integrating device in the dispatcher's station, means controlled from the dispatcher's station for transmitting impulses at desired intervals from said remote station to the dispatcher's station dependent in number upon the quantity integrated by said device since the last interval when impulses were transmitted, and indicating means in the dispatcher's station for integrating impulses transmitted at a plurality of intervals thereby to indicate the quantity integrated by said integrating device.

10. In combination, an integrating device, a pair of members, means for displacing one of said members with respect to the other by an amount dependent upon the quantity integrated by said device over a desired interval, means for actuating one of said members sufficiently to restore the relative position occupied by said members at the beginning of said desired interval and for transmitting impulses to a remote point dependent in number upon the degree of actuation required to restore said relative position, means at the remote point responsive to said impulses for indicating the reading of said integrating device, and means at said remote point for initiating the actuation of said second-mentioned means.

11. In combination, an integrating device, an impulse storage mechanism, means for supplying impulses to said mechanism over a desired interval of relatively long duration at a variable rate dependent upon the quantity integrated by said integrating means, and means included in said mechanism for producing impulses at the end of said interval in comparatively rapid sequence dependent in number upon the number of impulses supplied to said mechanism during said interval.

12. In combination, a remote station, a dispatcher's station, means for interconnecting said stations, a power integrating device in the remote station, means for producing impulses at a variable rate dependent upon the amount of power being integrated by said device, means for storing said impulses produced at a variable rate in said remote station means for releasing said impulses at desired intervals when said stations are connected together, and integrating means in the dispatcher's station responsive to said released impulses for indicating the power integrated by said integrating device at the remote station.

13. In combination, a station, a second station, means for interconnecting said station, means in the first station for integrating a variable quantity and for producing impulses at a rate determined by said variable quantity, means for storing said impulses, a second means in said first station for transmitting impulses at a predetermined rate independent of said variable rate and in number dependent upon the number of impulses stored in said impulse storing means, and thereby discharging said storing means, means for causing operation of said last means from the second station when said stations are connected together, thereby to discharge said storing means, and totalizing means in said second station responsive to impulses transmitted by said second-mentioned means for indicating the quantity integrated by said integrating means.

CLYDE E. STEWART.